United States Patent
Parker

(10) Patent No.: US 9,296,473 B2
(45) Date of Patent: Mar. 29, 2016

(54) SLAT SUPPORT ASSEMBLY

(71) Applicant: Airbus Operations Limited, Bristol (GB)

(72) Inventor: Simon John Parker, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 77 days.

(21) Appl. No.: 13/907,492

(22) Filed: May 31, 2013

(65) Prior Publication Data

US 2013/0334364 A1 Dec. 19, 2013

(30) Foreign Application Priority Data

May 31, 2012 (GB) .................................. 1209686.3

(51) Int. Cl.
*B64C 3/38* (2006.01)
*B64C 13/28* (2006.01)
*B64C 9/22* (2006.01)

(52) U.S. Cl.
CPC . *B64C 13/28* (2013.01); *B64C 9/22* (2013.01); *Y02T 50/44* (2013.01)

(58) Field of Classification Search
USPC .............................. 244/99.2, 99.3, 89, 99.14
See application file for complete search history.

(56) References Cited

U.S. PATENT DOCUMENTS

| | | | | |
|---|---|---|---|---|
| 4,399,970 A * | 8/1983 | Evans | ............................ | 244/214 |
| 4,753,402 A * | 6/1988 | Cole | ............................. | 244/210 |
| 4,838,503 A * | 6/1989 | Williams | ....................... | 244/214 |
| 5,702,072 A * | 12/1997 | Nusbaum | ....................... | 244/225 |
| 5,807,007 A | 9/1998 | Stemper | | |
| 5,839,699 A * | 11/1998 | Bliesner | ......................... | 244/214 |
| 6,149,105 A * | 11/2000 | Jaggard | .......................... | 244/214 |
| 8,025,257 B2 * | 9/2011 | Gyuricsko et al. | ............. | 244/214 |
| 8,245,982 B2 * | 8/2012 | Vormezeele et al. | ......... | 244/214 |
| 8,511,619 B2 * | 8/2013 | Mann | .............................. | 244/214 |
| 8,628,045 B2 * | 1/2014 | Lauwereys et al. | ........... | 244/213 |
| 8,967,549 B2 * | 3/2015 | Cathelain et al. | .............. | 244/214 |
| 2002/0005462 A1 | 1/2002 | Broadbent | | |
| 2007/0034747 A1 * | 2/2007 | Amorosi et al. | ............... | 244/215 |
| 2007/0102587 A1 | 5/2007 | Jones et al. | | |
| 2011/0220762 A1 * | 9/2011 | Gyuricsko et al. | ........... | 244/99.3 |
| 2012/0012712 A1 * | 1/2012 | Eden | .............................. | 244/201 |
| 2013/0126670 A1 * | 5/2013 | Vaghela | ........................ | 244/99.3 |
| 2013/0233967 A1 * | 9/2013 | Salthouse et al. | ............. | 244/99.3 |

(Continued)

FOREIGN PATENT DOCUMENTS

EP 2284077 A2 2/2011
EP 2390176 A2 11/2011

(Continued)

OTHER PUBLICATIONS

UK Search Report for Application No. GB1209686.3 mailed Sep. 27, 2012.

(Continued)

*Primary Examiner* — Christopher P Ellis
(74) *Attorney, Agent, or Firm* — Hauptman Ham, LLP

(57) ABSTRACT

A slat support assembly is disclosed. It comprises a slat support arm which is movable to deploy a slat from a leading edge of an aircraft wing about an axis of rotation of the arm and a slat mount on a slat which is coupled to one end of said slat support arm by a joint. The joint is configured to allow the slat mount to slide in a direction of the axis of rotation of the arm.

25 Claims, 6 Drawing Sheets

(56) References Cited

U.S. PATENT DOCUMENTS

2013/0277498 A1*  10/2013  Winkelmann ................ 244/99.3
2014/0209734 A1*  7/2014  Okabe et al. ................ 244/99.3

FOREIGN PATENT DOCUMENTS

| GB | 2260521 | A | * | 4/1993 |
| JP | 5954806 | A | | 3/1984 |
| JP | 2012501895 | A | | 1/2012 |
| WO | 2005077756 | A1 | | 8/2005 |
| WO | 2009150445 | A1 | | 12/2009 |

OTHER PUBLICATIONS

Office Action in JP Appln No: 2013-109458, dispatched Nov. 4, 2015.

* cited by examiner

SLAT SUPPORT ASSEMBLY

RELATED APPLICATIONS

The present application is based on, and claims priority from, Great Britain Application Number 1209686.3, filed May 31, 2012, the disclosure of which is hereby incorporated by reference herein in its entirety.

INTRODUCTION

The invention relates to a slat support assembly for supporting a slat on the leading edge of an aircraft wing. The invention also relates to a joint for coupling a slat to one end of a slat support arm and an aircraft wing comprising at least one slat attached to a leading edge of the wing using the support assembly of the invention.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 is provided with an arcuate support arm or slat track 3 one end 4 of which is attached to the rear of the slat 2 by a fixed joint and extends into the wing 1. The support arm 3 penetrates a machined rib 5 and a wing spar 6 forming the wing structure. The support arm 3 defines an arc having an axis and is mounted within the wing so that it can rotate about that axis (in the direction indicated by arrows "A" and "B" in FIG. 1) to deploy and retract the slat 2 attached to one end of the support arm 3, with the axis extending along the wing.

To drive the slat rack 3 so as to deploy or retract the slat 2, a toothed slat rack 7 having an arcuate shape corresponding to the arcuate shape of the support arm 3 is mounted within a recess 3a on the support arm 3 and a correspondingly toothed drive pinion 8 is in engagement with the teeth 7a on the slat rack 7 so that when the drive pinion 8 rotates, the teeth 8a on the drive pinion 8 and the teeth 7a on the rack 7 cooperate to pivot or drive the slat rack 7 and the slat 2 attached thereto, into a deployed position, i.e. in the direction of arrow "A" in FIG. 1. Typically, the support arm 3 rotates through an angle of 27 degrees between its fully stowed and fully deployed positions. Rotation of the pinion 8 in the opposite direction also drives the support arm 3, in the direction of arrow "B", back into its stowed position, as shown in FIG. 1.

The drive pinion 8 is mounted on a shaft 9 that extends along, and within, the leading edge of the wing 1. Several gears 8 may be rotatably mounted on the shaft 8, one for driving each slat 2 so that when the shaft 9 is rotated by a slat deployment motor close to the inboard end of the wing 1, all the support arms 3 are deployed together so that the slat 2, or a plurality of slats, is deployed uniformly.

The support arm 3 has a generally square cross-sectional profile such that its upper and lower surfaces 3b, 3c each define a portion of a curved surface of a cylinder each having its axis coaxial with the axis of rotation of the support arm 3.

The support arm 3 is supported between front upper and lower roller bearings 10a, 10b, and rear upper and lower roller bearings 11a, 11b spaced from the front upper and lower roller bearings 10a. The axis of rotation of each bearing 10a, 10b, 11a, 11b is parallel to the axis of rotation of each of the other bearings 10a, 10b, 11a, 11b and to the axis about which the support arm 3 rotates in the direction of arrows "A" and "B" between its stowed and deployed positions. The upper bearings 10a, 11a lie in contact with the upper surface 3b of the support arm 3 and the lower bearings 10b, 11b lie in contact with the lower surface 3c so that they support the support arm 3 and guide it during deployment and retraction. The bearings 10a, 10b, 11a, 11b resist vertical loads applied to the slat 2 during flight both in stowed and deployed positions and also guide movement of the support arm 2 during slat deployment and retraction.

It will be appreciated that the bearings 10a, 10b, 11a, 11b resist loads that are applied in the vertical direction only. By vertical loads are meant loads that act in a direction extending in the plane of the drawing or, in a direction acting at right-angles to the axis about which the support arm 3 rotates in the direction of arrows "A" and "B" between its stowed and deployed positions.

It will be appreciated that there can be significant side loads acting on a slat 2 in addition to loads acting in a vertical direction during flight, especially as the slats 2 generally do not extend along the leading edge of the wing 1 exactly square to the direction of airflow. By side-loads is meant loads that act in a direction other than in a direction that extends in the plane of the drawing or, in other words, those loads that act in a direction other than at right-angles to the axis about which the support arm 3 rotates in the direction of arrows "A" and "B" between its stowed and deployed positions.

To counteract side-loads, the support arm 3 is also supported by side bearings 12 disposed on either side of the support arm 3 as opposed to the vertical load bearings 10, 11 mounted above and below the support arm 3. These side-load bearings 12 are generally roller bearings, however it will be appreciated that they may just comprise bearing surfaces, pads or cushions against which the side walls of the support arm 3 may bear when side loads are applied to the slat 2.

As the opposing side rollers are spaced to abut against the support arm to restrict lateral movement of the support arm and slat with respect to the wing, there is an issue that manufacturing tolerances can lead to misalignment of the support arms. To deal with this problem, it is known to assemble a wing with a slat disposed in position. The slat is then operated with a primary or master support arm fixedly mounted to the slat, but with one or more secondary support arms being movable mounted to the slat. The operation of the slat then determines the ideal alignment of the slat and the one or more secondary support arms, which are then fixedly mounted to the slat in an aligned position. Therefore, any manufacturing tolerances are accounted for as a result of this assembly method. However, an additional problem exists due to wing bending and deployment of the slat, which is caused, in part, by fixably mounting the support arms to the slat.

As a consequence of this, an arrangement is known in which at least some of the side-load bearings are spaced from their respective support arm. This arrangement is schematically illustrated in FIG. 2, in which a primary support arm 15 is disposed parallel to and spaced from a secondary support arm 16.

The primary and secondary support arms 15,16 are fixedly mounted to the slat 2 by fixed joints 19. The primary support arm 15 is supported by opposing front side-load bearings 17 disposed on either side of the support arm 15, opposing rear side-load bearings 18 disposed on either side of the support arm 15, and upper and lower bearings (not shown). The rear side-load bearings 18 are spaced from the front side bearings 17, and each of the primary support arm side-load bearings 17, 18 abut against the primary 15 support arm to a close clearance tolerance to restrict lateral movement of the master support arm 15.

Similarly, the secondary support arm 16 is supported by opposing front side-load bearings 17a disposed on either side of the secondary support arm 16, opposing rear side-load bearings 18a disposed on either side of the secondary support arm 16 and upper and lower bearings (not shown). The rear side-load bearings 18a are spaced from the front side bearings 17a. The rear side-load bearings 18a of the secondary support arm 16 abut against the secondary support arm 16 to a close clearance tolerance to restrict lateral movement of the secondary support arm 16 proximate thereto. However, the front side-load bearings 17a of the secondary support arm 16 are spaced away from the secondary support arm 16 so that there is a clearance between the secondary support arm 16 and its front side-load bearings 17a. As a consequence of this, the secondary support arm is capable of sliding laterally to compensate for wing bending.

However, an issue with the above arrangement is that support of the secondary support arm is reduced, and undue loads are applied to the bearings. It will also be appreciated that space for components within the wing structure close to the leading edge of the wing 1 is very limited, and so such arrangement may lead to increasing weight, manufacturing costs and complexities.

Furthermore, an alternative slat support assembly has been proposed, as recited in Airbus's own earlier patent application WO/2010/026410, in which at least some of the bearings supporting each support arm are disposed to rotate about an axis which is inclined at an angle so that each bearing resists loads that are applied both in vertical and horizontal directions. However, it will be appreciated that in such an arrangement it is not possible to provide a clearance between the bearings and the support arm to allow for lateral movement in a horizontal direction, without allowing movement in a vertical direction, which is undesired. Therefore, it is not possible to compensate for wing bending with such a revised support arm assembly using the arrangement described above.

Embodiments of the invention seek to provide an aircraft slat support assembly that overcomes or substantially alleviates the problems referred to above.

SUMMARY OF THE INVENTION

According to the present invention, there is provided a slat support assembly comprising a slat support arm which is movable to deploy a slat from a leading edge of an aircraft wing about an axis of rotation of the arm and a slat mount on a slat which is coupled to one end of said slat support arm by a joint, wherein the joint is configured to allow the slat mount to slide in a direction of the axis of rotation of the arm.

Preferably, the joint comprises a bearing element mounted to the slat mount, the bearing element being slidably received in a bearing sleeve on the slat support arm.

The bearing element may be configured to slide in a linear direction in the bearing sleeve.

Preferably, the bearing element comprises a shaft which is slidable in the bearing sleeve in a direction along a longitudinal axis of the shaft.

Conveniently, the bearing sleeve comprises opposing bushes on the slat support arm and ends of the shaft are slidably received in the bushes, and the shaft extends between the opposing bushes.

The slat support assembly may further comprise a yoke formed at the one end of the slat support arm with two spaced yoke members, wherein the opposing bushes are formed in the yoke members.

In one embodiment, the slat mount is disposed between the yoke members.

Advantageously, the slat mount is mountable to the shaft of the bearing element between the ends of the shaft.

Conveniently, the ends of the shaft form cylindrical bearing journal surfaces which mate with corresponding bearing seats of the bushes.

Preferably, the longitudinal axis of the shaft extends parallel to the axis of rotation of the arm.

Each bush may have an end stop at an end thereof, and the ends of the shaft may be capable of abutting the end stops to restrict the range of motion of the shaft.

The length of the shaft may be shorter than the distance between the end stops of the opposing bushes so that the shaft is slidable in the bushes between the two end stops.

Preferably, an outlet is formed through each end stop.

Conveniently, the slat mount is pivotally mounted to the shaft.

The slat support assembly may further comprise a collar on the slat mounting slat mount which locates around and mates with the shaft.

Advantageously, the shaft further comprises a part-spherical section disposed between each end of the shaft and the collar locates around and mates with the part-spherical section of the shaft.

Preferably, the range of motion of the shaft is configured to prevent the slat mount abutting the yoke members.

In a preferred embodiment, the slat support assembly further comprises a link arm extending between the slat support arm and the slat to prevent rotation of the slat about the longitudinal axis of the shaft.

The link arm may be pivotally mounted to the slat support arm and the slat by spherical bearings.

In one embodiment, a pin extends through the shaft along the longitudinal axis of the shaft to strengthen the shaft.

Preferably, the pin is fixedly mounted at each end to the bearing seat and the shaft is slidable along the pin. The pin may be fixedly mounted to the end stops.

The slat support assembly may further comprise a plurality of bearings mountable within a wing, each bearing being in rolling contact with an associated bearing surface on the slat support arm to support the slat support arm and guide it during deployment and retraction of the slat, wherein at least some of the bearing surfaces and associated bearings are configured so that each bearing counteracts load applied to the slat support arm in more than one direction.

Conveniently, the slat support arm has a pair of adjacent upper bearing surfaces, each upper bearing surface being arranged at an angle relative to its adjacent upper bearing surface such that a bearing associated with one upper bearing surface does not share a common axis with the bearing associated with the other upper bearing surface.

Advantageously, the slat support assembly comprises a groove in the slat support arm and a slat rack mounted to the slat support arm in the groove for cooperation with a drive pinion configured to rotate the slat track about its axis for deployment and retraction of the slat.

According to another aspect of the invention, there is provided a joint for coupling a slat to one end of a slat support arm which is movable to deploy said slat from a leading edge of an aircraft wing about an axis of rotation of said slat support arm, the joint comprising a bearing element mountable to a slat and a bearing element sleeve mountable to a slat support arm, wherein the bearing element is configured to slide in the sleeve so that said slat is slidable relative to said slat support arm in the direction of the axis of rotation of the arm.

According to another aspect of the invention, there is provided an aircraft wing having a slat and a slat support assembly according to the invention.

Preferably, the slat support assembly according to the invention is a secondary slat support assembly which mounts a secondary slat mount of a slat to a secondary slat support assembly, and the aircraft wing further comprises a primary slat support assembly configured to fixedly mount a primary slat mount of said slat to a primary slat support arm which is configured to prevent the primary slat mount from sliding in the direction of the axis of rotation of the primary slat support arm.

DESCRIPTION OF THE DRAWINGS

Embodiments of the invention will now be described, by way of example only, and with reference to FIGS. 2 to 7 of the accompanying drawings, in which.

DESCRIPTION OF THE PREFERRED EMBODIMENTS

Figure 1:
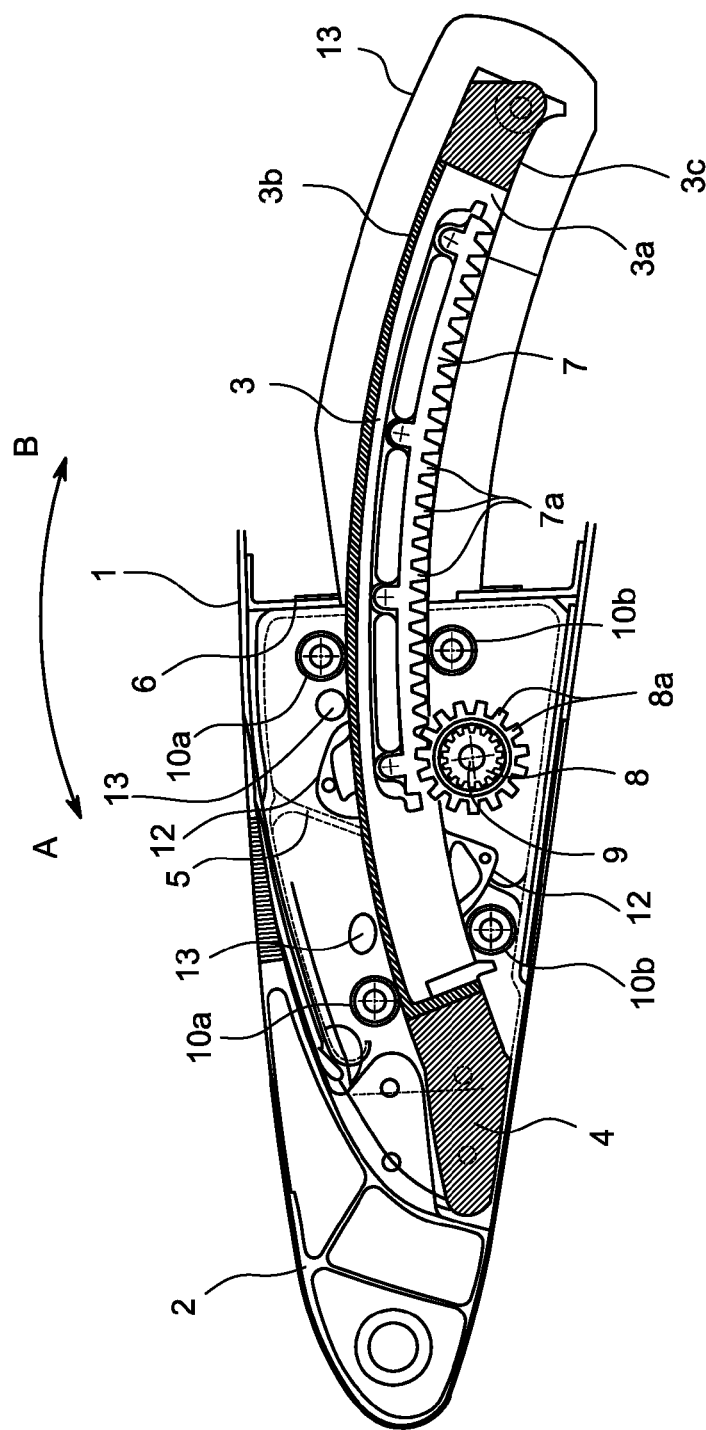
FIG. 1 is a prior art side sectional view through a portion of a leading-edge of a wing of an aircraft with a slat shown in its stowed position.
Figure 2:
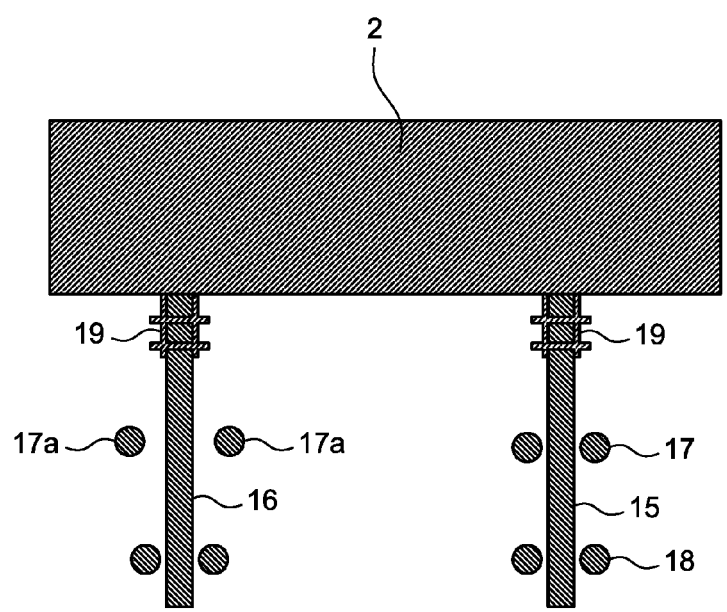
FIG. 2 is a prior art schematic view of a portion of a leading-edge of wing of an aircraft showing a slat mounted by slat support arms.

FIGS. 1 and 2 represent prior art views of a portion of a leading edge of a wing and slat and have already been described above.

Figure 3:
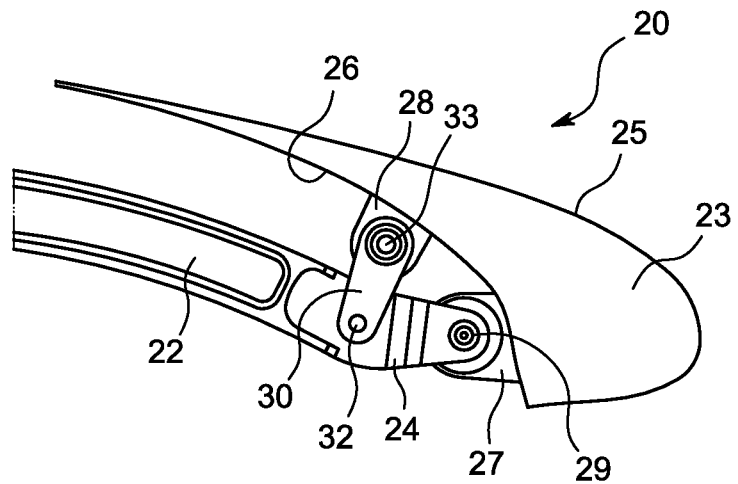
FIG. 3 is a schematic side sectional view showing a slat support arm configuration mounted to a slat to illustrate the principle of the present invention.

Referring now to FIG. 3, there is shown a simplified side sectional view of a slat support assembly 20 comprising a slat support arm or slat track 22 coupled to a slat 23. A front end 24 of the support arm 22 is attached to the slat 23, and a slat track support assembly (not shown) supports and mounts the support arm 22 to a wing, and enables the slat to be moved between its stowed and deployed positions. The slat track support assembly is not shown in this Figure, however it is described above in respect to the prior art, and so a further detailed description of the slat track support assembly will not be given herein.

The slat support arm 22 is arcuate and rotates about its theoretical centre or axis (not shown in the Figures) to urge the slat 23 attached to the slat support arm 22 to rotate in the direction of arrows "A" and "B", between its stowed and deployed positions. The axis about which the slat support arm 22 rotates extends longitudinally along the width of the slat 23, extending in a direction out of the sheet towards the viewer, as is conventional.

The slat 23 comprises an outer face 25 and an inner face 26. First and second slat mounts or mounting lugs 27, 28 extend from the inner face 26 for attaching the slat 23 to the slat support arm 22, as will be explained hereinafter. Although only one slat support arm 22 and corresponding first and second slat mounts 27,28 are shown, it will be appreciated that two or more slat support arms 22 may be attached to and spaced along the slat 23 by a plurality of corresponding slat mounts 27,28.

The slat support arm 22 is coupled to the slat 23 at the front end 24 of the support arm 22 by a first joint 29 which couples the front end 24 of the support arm 22 to the first slat mount 27 extending from the slat 23, as will be explained hereinafter. A link arm 30 is coupled to the slat support arm 22 by a second joint 32, which is spaced from the first joint 29 along the slat support arm 22. The other end of the link arm 30 distal to the slat support arm 22 is coupled to the slat 23 by a third joint 33 which attaches said end of the link arm 26 to the second slat mount 28 extending from the slat 23.

A triangular truss is defined by the link arm 30, a section of the slat support arm 22 between the first and second joints 29, 32 and a section of the slat 23 between the first and second slat mounts 27,28. The truss prevents the slat 23 from rotating about the first joint 29 on an axis extending parallel to the theoretical axis of the slat support arm 22 about which the slat support arm 22 rotates between its stowed and deployed positions.

Figure 4:
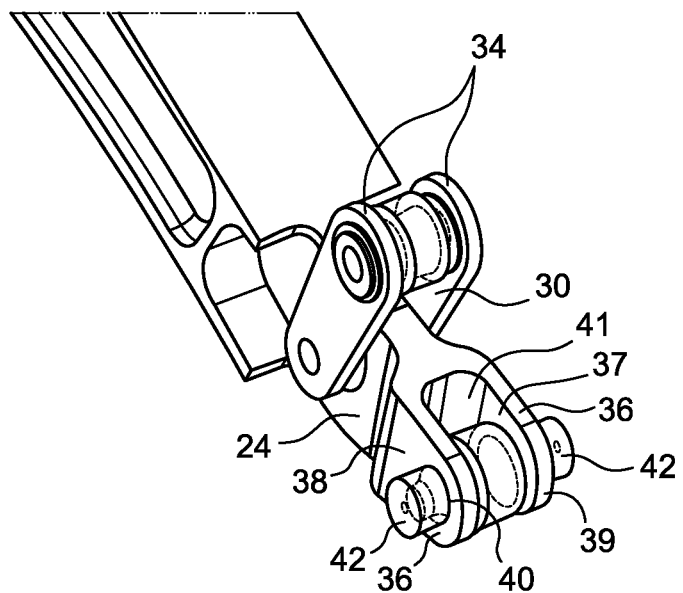
FIG. 4 is a schematic perspective view illustrating the slat support arm mounted to the slat shown in FIG. 3.

The front end 24 of the slat support arm 22 is shown in FIG. 4 with the slat 23 removed for clarity. The link arm 30 comprises two parallel link members 34 which are spaced from each other and are disposed on, and mounted to, opposing sides of the slat support arm 22. Similarly, although it is not shown in FIG. 4, it will be understood that the second slat mount 28 extends between the two parallel link members 34 of the link arm 30 at a distal end of the link arm 30 to the support arm 22.

A yoke 35 extends from the front end 24 of the slat support arm 22. The yoke 35 comprises a pair of spaced yoke members 36 which extend parallel to each other and define a slat mount receiving space 41 therebetween. Each yoke member 36 has an inner surface 37 facing the other yoke member, and an outer surface 38. A bush receiving aperture 40 is formed through each yoke member 36 between its inner and outer surfaces 37, 38 and a corresponding plain bearing or bush 42 is received in each aperture 40, as will be explained hereinafter. Although in the present embodiment the bushes are fixedly mounted in each yoke member 36, it will be appreciated that in an alternative embodiment the bushes may be formed together with the yoke members.

Figure 5:
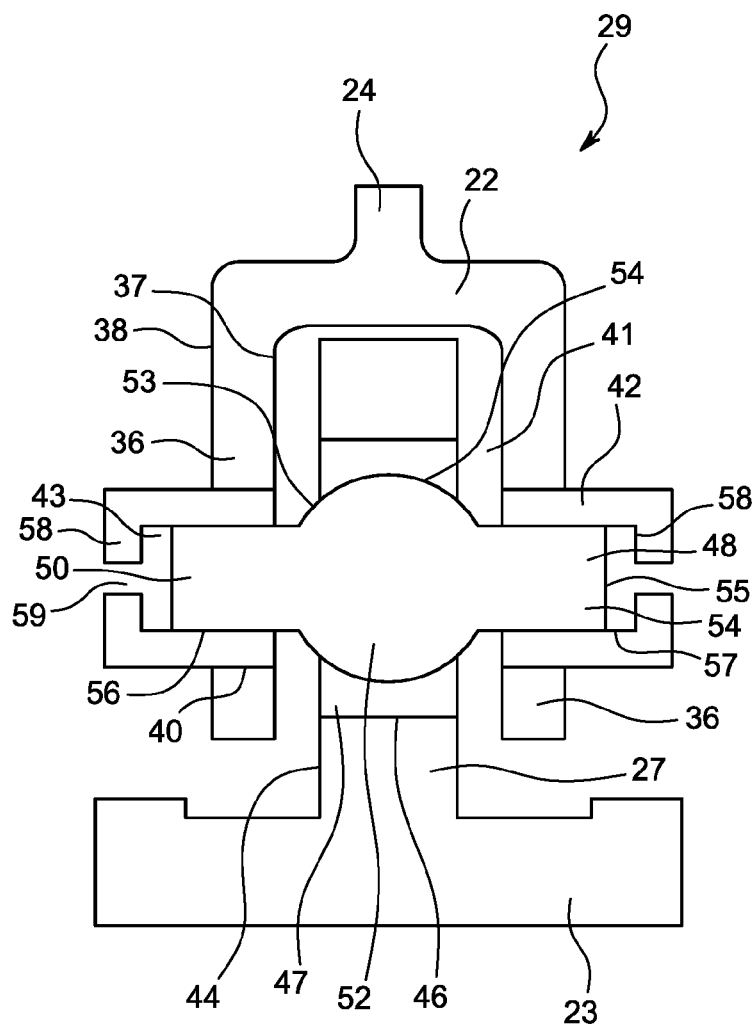
FIG. 5 is a schematic cross-sectional view through the slat support arm configuration shown in FIG. 3.

The first slat mount 27 extending from the inner face 26 of the slat 23 comprises opposing side faces 44, as shown in FIG. 5. A collar receiving aperture 46 is formed to extend between the side faces 44 to receive a bearing collar 47 therein.

Referring now to FIG. 5, the first joint 29 is illustrated in cross-section coupling the front end 24 of the support arm 22 to the first slat mount 27 extending from the slat 23. The first slat mount 27 of the slat 23 is disposed in the slat mount receiving space 41 defined between the yoke members 36 of the slat support arm 22. The first joint 29 further comprises the bushes 42 defining a bearing sleeve 43 fixedly mounted in the respective bush receiving apertures 40 formed through each yoke member 36, the bearing collar 47 fixedly mounted in the first slat mount 27, and a bearing element 48 which is slidably received in the bushes 42 and bearing collar 47, as will be explained in detail hereinafter.

The bearing element 48 comprises a shaft 50 which is received in the bearing sleeve 43 such that it extends between the bushes 42 in the opposing yoke members 36 and has a central part-spherical region 52 that forms a male bearing seat or surface 53. The collar 47 in the first slat mount 27 defines an inner or female part spherical bearing surface 54 that locates around, and mates with, the part-spherical bearing surface 53 formed on the shaft 50 of the bearing element 48 so that the bearing element 48, and therefore the slat support arm 22 can rotate relative to the slat 23 in all directions.

End portions 54 of the shaft 50 extending from the central part-spherical region 52 of the bearing element 48 are received in the bushes 42. The end portions 54 extend along an axis defining the longitudinal axis of the shaft 50 and each has a shaft end face 55. The end portions 54 are cylindrical and their circumferential outer surfaces 56 form a male bearing surface.

Each bush 42 forms a bearing seat 57 in which the end portions 54 of the shaft 50 are received. An inner end of each bush 42 lies flush with the inner surface 37 of the corresponding yoke member 36, whereas an outer end of each bush 42 extends from the outer surface 38 of the corresponding yoke member 36 so that each end portion 54 of the shaft 50 is fully received in the bushes 42 of the bearing sleeve 43. Each bush 42 has an end stop 58 at an outer end against which an end face 55 of the respective shaft end portion 52 may abut when the bearing element 48 slides in the bearing sleeve 43 toward the end stop 58, as will be explained hereinafter. An inner surface of each bush 42 forms a female bearing surface that locates around, and mates with, the male bearing surfaces of the shaft end portions 54 so that the bearing element 48 slides linearly in the bearing sleeve 43 along its longitudinal axis, as will become apparent hereinafter.

An outlet 59 is formed through each end stop 58 to allow the flow of air therethrough to prevent the bearing element 48 acting as a piston and causing a pressure differential in the space defined between the bushes 42 and the shaft 50 when the bearing element 48 slides in a linear motion along its longitudinal axis towards one of the end stops 58.

The length of the bearing element 48 between the opposing shaft end faces 54 is less than the distance between the end stops 57 of the opposing bushes 42 of the bearing sleeve 43. Therefore, when the slat 23 is in a neutral position, that is the first slat mount 27 is not urged to move laterally and is disposed equidistant from each yoke member, the end faces 54 of the shaft 50 are spaced from the end stops 57 at opposing ends of the bearing sleeve 43, and a gap is formed therebetween.

The second and third joints 32, 33 mounting the link arm 34 to the slat support arm 22 and second slat mount 28 of the slat 23 respectively comprise conventional spherical bearings, and so a detailed description will be omitted herein.

Figure 7:
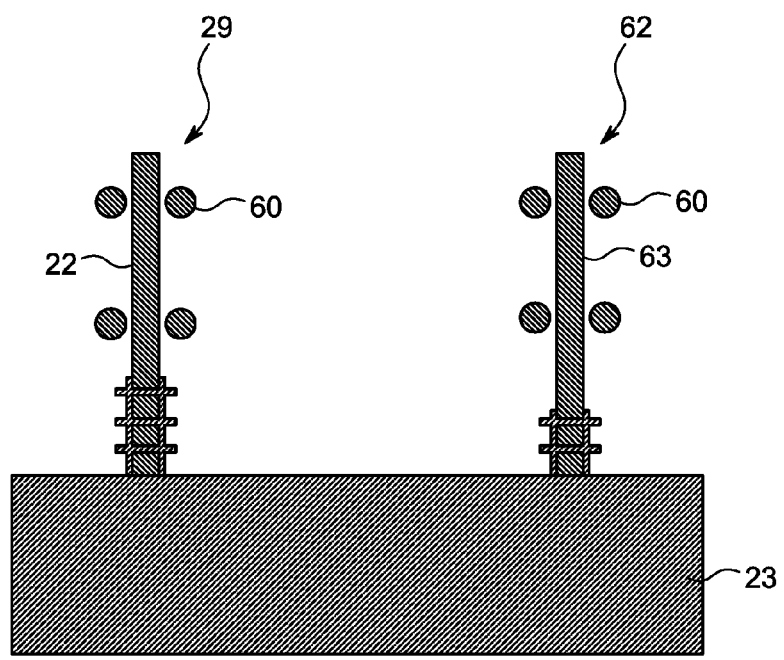
FIG. 7 is a schematic view of a portion of a leading-edge of wing of an aircraft showing a slat mounted by slat support arms

Referring to FIG. 7, the slat 23 is mounted to the wing (not shown) by two slat support assemblies 29,62. Each support arm of the slat support assemblies is mounted to the wing by a corresponding slat track support assembly 60 so that the slat 23 is rotatable between its stowed and deployed positions. The slat 23 is mounted by means of a primary slat support assembly 62 and a secondary slat support assembly 20. Although only one secondary slat track assembly is shown in the exemplary Figures, it will be appreciated that a slat may be mounted by a plurality of secondary slat support assemblies.

The above described embodiment of the slat support assembly 20 is a secondary slat support assembly which allows limited movement of the first slat mount 27, and therefore the slat 23 proximate the secondary slat support assembly 20, in a direction along the span of the wing, parallel to the theoretical axis of rotation of the slat support arm 22.

Although a detailed view of the primary slat support assembly 62 is not given herein the primary slat support assembly 62 has a similar arrangement to the slat support assembly 20 described above, however in the primary slat support assembly 62 each of the first, second and third joints mounting the slat 23 to a primary slat support arm 63 is a conventional spherical bearings and does not allow lateral movement of a primary slat mount extending from the slat 23 relative to the slat support arm 63. Therefore, the primary slat support assembly 62 resists movement of the slat 23 in a direction along the span of the wing, in a direction parallel to the theoretical axis of rotation of the slat support arm 22 and so prevents a translation of the slat 23 along the wing, in a span-wise direction.

However, the primary slat support assembly 62 does allow a limited rotation of the slat 23 relative to the wing to account for misalignment due to manufacturing tolerances and wing bending. When wing bending or a misalignment occurs, then the secondary slat support assembly 20 allows the first slat mount 27 extending from the slat 23 to slide relative to the secondary support arm 22 along an axis parallel to the theoretical axis of rotation of the support arm 22 due to the bearing element 52 sliding in the bushes 42 of the bearing sleeve 43 disposed in the yoke 36 of the slat support arm 22.

When the first slat mount 27 of the secondary slat support assembly 20 is urged in a direction along the span of the wing due to wing bending, or a misalignment due to manufacturing tolerances, the bearing collar 47 disposed in the slat mount 27 is urged to slide together with the slat mount. The female bearing surface 54 of the bearing collar 47 acts on the male bearing seat 53 of the central part-spherical region 52 of the bearing element 48 and urges the bearing element 48 to slide laterally. Furthermore, the bearing element 48 is rotatable in the bearing collar to prevent a moment acting on the bearing element due to the force applied by the bearing collar 47. The shaft of the bearing element 47 is slidable in the bushes 42 along its axis and so reduces the load applied to the slat support arms and limits the possibility of failure due to fatigue of the slat support assemblies. In the event that the first slat mount 27 of the slat support assembly 20 is urged to slide beyond a predetermined position, the shaft end face 55 of the bearing element 48 abuts against the end stop 58 of the respective bush 42, to restrict the range of motion of the bearing element 48 and so restrict movement of the slat mount 27 in a span-wise direction.

The range of linear movement of the bearing element shaft 50 in the bearing sleeve is less than the potential range of motion of the slat mount 27 in the slat mount receiving space 41, such that first slat mount 27 does not contact the inner surfaces 37 of the yoke members 36, whereby the end face 55 of the shaft 50 abuts the end stop 58 in the bearing sleeve 43 before the slat mount 27 impacts the inner surface 37 of the corresponding yoke member, therefore preventing damage to the yoke member and/or slat mount.

Similarly, in the event that the secondary slat support arm 22 is urged to slide in a span-wise direction along the span of the wing relative to the slat 22, then the bushes 42 of the bearing sleeve 43 slide over the shaft 50 of the bearing element 48 to reduce the loads transferred by the first joint.

Figure 6:
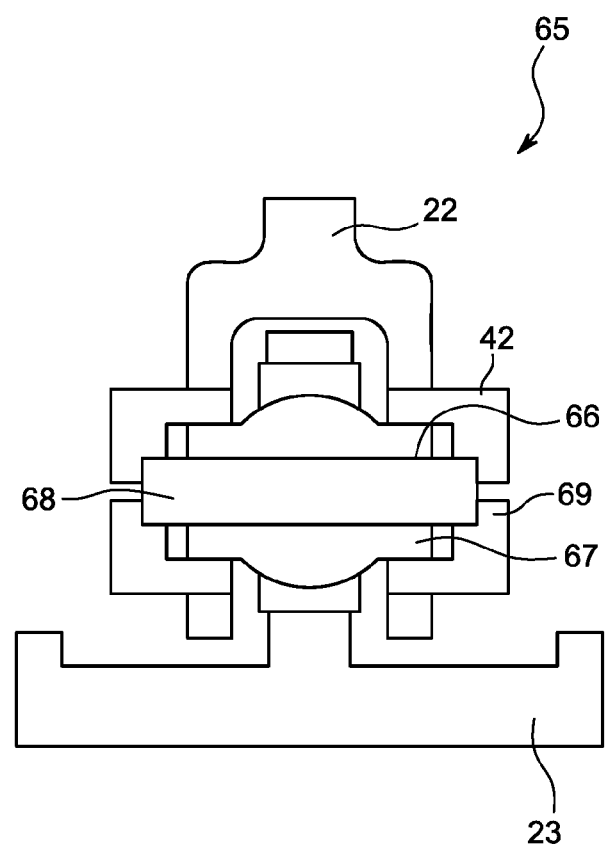
FIG. 6 is a schematic cross-sectional view of a modification of a slat support arm configuration according to another embodiment.

Another embodiment of the invention will now be described with reference to FIG. 6 which shows a similar arrangement to that shown in FIG. 5, except that a bore is formed through the shaft of the bearing element along its longitudinal axis, and a failsafe pin is disposed therein. As features and components of this embodiment of the invention are generally the same as the embodiment of the invention described above, a detailed description will be omitted herein. Furthermore, features and components corresponding to features and components described above will be given the same reference numerals.

In the present embodiment, a first joint 65 for mounting the slat 23 to the slat support arm 22 is shown. A bore 66 is formed through a bearing element 67 and a fail safe pin 68 extends therethrough. The bore 66 extends along the longitudinal length of the shaft 50, and the bore 66 and the failsafe pin 68 are configured so that the bearing element 67 is slidable along the failsafe pin 68. The failsafe pin 68 and the bearing element 67 are disposed in the bearing sleeve 43, with the failsafe pin 68 extending between the bushes 42. The failsafe pin 68 is fixedly mounted in the bearing sleeve 43 with each end of the pin 68 fixedly mounted in end stops 69 at each end of the bushes 42. Therefore, when the bearing element 67 slides laterally in the bushes 42 of the bearing sleeve 43, the bearing element 67 also slides along the failsafe pin 68. The failsafe pin 68 provides additional support to the joint 65 and reduces the risk of failure of the slat support assembly.

In the above described embodiments of the invention, as there is no longer any requirement to space the slat support arm guide bearings from the slat support arm to allow for span-wise movement of the slat, then the guide roller bearings can be placed much closer together, thereby saving space within the wing structure.

Embodiments of the invention essentially allow span wise movement of the slat proximate to the joint of the invention to allow for wing bend and misalignment without imparting an undue load on the guide roller bearings opposing side-loads and vertical loads. Furthermore, the present invention enables the guide roller bearings opposing side-loads and vertical loads to have close clearance tolerances with the corresponding slat support arms, and so reduces movement of the arms and slats relative to the roller bearings so that movement of components within the wing is minimised, as well as enabling weight reduction and/or greatly reducing the design space constraints in the densely populated leading edge of the wing. It will also be appreciated that the joint of the present invention is applicable to slat support assemblies having separate vertical and side-load bearings, as well as slat support assemblies having bearings which are configured to resist loads acting in both vertical and sideways directions in which the side-loads are now counteracted by the same bearings that counteract the vertical loads.

It will be appreciated that the foregoing description is given by way of example only and that modifications may be made to the joint for coupling a slat to one end of a slat support arm of the present invention or to the slat support assembly of the present invention without departing from the scope of the appended claims.

The invention claimed is:

1. A slat support assembly comprising a slat support arm which is movable to deploy a slat from a leading edge of an aircraft wing about an axis of rotation of the arm and a slat mount on a slat which is coupled to one end of said slat support arm by a joint, the joint comprising a bearing element, wherein the bearing element comprises a shaft having a longitudinal axis parallel to said axis of rotation of the arm, and a bearing sleeve, the shaft being slidable in the bearing sleeve in a direction along said longitudinal axis of the shaft together with the slat mount, thereby allowing the slat mount to slide in a direction of the axis of rotation of the arm.

2. A slat support assembly according to claim 1, wherein the bearing element being slidably received in a bearing sleeve on the slat support arm.

3. A slat support assembly according to claim 1, wherein the bearing sleeve comprises opposing bushes on the slat support arm and ends of the shaft are slidably received in the bushes, and the shaft extends between the opposing bushes.

4. A slat support assembly according to claim 3, further comprising a yoke formed at the one end of the slat support arm with two spaced yoke members, wherein the opposing bushes are formed in the yoke members.

5. A slat support assembly according to claim 4, wherein the slat mount is disposed between the yoke members.

6. A slat support assembly according to claim 3, wherein the slat mount is mountable to the shaft of the bearing element between the ends of the shaft.

7. A slat support assembly according to claim 3, wherein the ends of the shaft form cylindrical bearing journal surfaces which mate with corresponding bearing seats of the bushes.

8. A slat support assembly according to claim 3, wherein the longitudinal axis of the shaft extends parallel to the axis of rotation of the arm.

9. A slat support assembly according claim 3, wherein each bush has an end stop at an end thereof, and the ends of the shaft are capable of abutting the end stops to restrict the range of motion of the shaft.

10. A slat support assembly according to claim 9, wherein the length of the shaft is shorter than the distance between the end stops of the opposing bushes so that the shaft is slidable in the bushes between the two end stops.

11. A slat support assembly according to claim 9, wherein an outlet is formed through each end stop.

12. A slat support assembly according to claim 6, wherein the slat mount is pivotally mounted to the shaft.

13. A slat support assembly according to claim 12, further comprising a collar on the slat mounting slat mount which locates around and mates with the shaft.

14. A slat support assembly according to claim 13, wherein the shaft further comprises a part-spherical section disposed between each end of the shaft and the collar locates around and mates with the part-spherical section of the shaft.

15. A slat support assembly according to claim 9, wherein the range of motion of the shaft is configured to prevent the slat mount abutting the yoke members.

16. A slat support assembly according to claim 1, further comprising a link arm extending between the slat support arm and the slat to prevent rotation of the slat about the longitudinal axis of the shaft.

17. A slat support assembly according to claim 16, wherein the link arm is pivotally mounted to the slat support arm and the slat by spherical bearings.

18. A slat support assembly according to claim 1, wherein a pin extends through the shaft along the longitudinal axis of the shaft to strengthen the shaft.

19. A slat support assembly according to claim 18, wherein the pin is fixedly mounted at each end to the bearing seat and the shaft is slidable along the pin.

20. A slat support assembly according to claim 19, when dependent on claim 9, wherein the pin is fixedly mounted to the end stops.

21. A slat support assembly according to claim 2, further comprising a plurality of bearings mountable within a wing, each bearing being in rolling contact with an associated bearing surface on the slat support arm to support the slat support arm and guide it during deployment and retraction of the slat, wherein at least some of the bearing surfaces and associated bearings are configured so that each bearing counteracts load applied to the slat support arm in more than one direction.

22. A slat support assembly according to claim 21, wherein the slat support arm has a pair of adjacent upper bearing surfaces, each upper bearing surface being arranged at an angle relative to its adjacent upper bearing surface such that a bearing associated with one upper bearing surface does not share a common axis with the bearing associated with the other upper bearing surface.

23. A slat support assembly according claim 1, comprising a groove in the slat support arm and a slat rack mounted to the slat support arm in the groove for cooperation with a drive pinion configured to rotate the slat track about its axis for deployment and retraction of the slat.

24. A joint for coupling a slat to one end of a slat support arm which is movable to deploy said slat from a leading edge of an aircraft wing about an axis of rotation of said slat support arm, the joint comprising a bearing element mountable to a slat and a bearing element sleeve mountable to a slat support arm, wherein the bearing element comprises a shaft having a longitudinal axis parallel to said axis of rotation of the arm, and a bearing sleeve, the shaft being slidable in the bearing sleeve in a direction along said longitudinal axis of the shaft, thereby said slat is slidable relative to said slat support arm in the direction of the axis of rotation of the arm.

25. An aircraft wing having a slat and a slat support assembly according to claim 1.

* * * * *